United States Patent
Huang et al.

[11] Patent Number: 6,015,096
[45] Date of Patent: Jan. 18, 2000

[54] SPEED CONTROLLER WITH SCALES

[75] Inventors: Kuo-Feng Huang, Chu-Pei; Kuo-Chen Wang, Hsinchu Hsien; Hsien-Jung Hsu, Kaohsiung; Hung-Lung Ma, Miao-Li Hsien, all of Taiwan

[73] Assignee: United Microelectronics Corp., Taipei, Taiwan

[21] Appl. No.: 09/181,100

[22] Filed: Oct. 28, 1998

[51] Int. Cl.[7] ....................................... B67D 5/08
[52] U.S. Cl. ........................... 239/73; 116/277; 137/552; 137/556.6
[58] Field of Search .................. 239/71, 73; 116/277, 116/307, 309; 137/552, 556.6, 556.3

[56] References Cited

U.S. PATENT DOCUMENTS 1,688,390  10/1928  Lanza ........................................ 116/277

*Primary Examiner*—Lesley D. Morris
*Attorney, Agent, or Firm*—Thomas, Kayden, Horstemeyer & Risley

[57] ABSTRACT

A speed controller with scales according to the invention is used to adjust the amount of an air flow thereby to control the amount of a chemical liquid sprayed. The speed controller includes a housing, a controller body and a transparent tube. The controller body is partly inserted in the housing and has a rotary button located at one end thereof and outside the housing. The rotary button has a slot and an indicator thereon, wherein the indicator is located at one end of the slot. The transparent tube, having a vertical scale on the side thereof and a circular scale on the top circumference thereof, encloses the rotary button. In the invention, the position of the rotary button can be determined by reading the vertical scale and the circular scale so as to precisely control the amount of a chemical liquid sprayed, thereby increasing yield and improving engineering analysis.

11 Claims, 2 Drawing Sheets

1

SPEED CONTROLLER WITH SCALES

BACKGROUND OF THE INVENTION

1. Field of the Invention

The invention relates to a speed controller (SC), and in particular to a speed controller with scales by which the position of a rotary button thereof can be determined.

2. Description of the Related Art

In line with higher integration of IC devices, the accuracy of the semiconductor process apparently becomes more important. Once any tiny error occurs in the semiconductor process, it causes a failure to the entire process, resulting in wafer damaging or scraping. Therefore, a great amount of cost is consumed.

Photolithography is one of the most important steps in the entire semiconductor process. Any regions, related to the structure of MOS transistors, for subsequent patterning and doping, are defined by photolithography. Basically, the photolithography includes three steps of coating, exposing and developing.

As to the coating, if a photoresist liquid is not uniformly sprayed onto a wafer, it can cause a failure to the entire semiconductor process.

Referring now to FIG. 1, there is shown a photoresist spray system. When coating a photoresist on a wafer, a photoresist liquid is evacuated from a photoresist bottle 10 via a filter 14 to spray onto a wafer 16 by a pump 12, wherein the filer 14 is used to filter the photoresist liquid. Furthermore, at least one speed controller 18, which is connected to the pump 12, can be adjusted to control the amount of the photoresist liquid sprayed. The performance of the entire photoresist spray system hinges on the capability of the speed controller 18.

Next, referring to FIG. 2, a speed controller according to the prior art is shown. The speed controller is an SMC 1200 series speed controller or an SMC 1400 series speed controller.

In FIG. 2, the speed controller 18 includes a housing 22 and a controller body 20 which is partly inserted in the housing 22. In addition, the controller body 20 has a rotary button 24 at one end thereof and a fixing button 26 under the rotary button 20. The rotary button 24 has stripes thereon which are designed to facilitate adjusting the amount of an air flow in the pump 12. The fixing button 26 is used to lock the rotary button 24 thereby to prevent unintentional adjustments.

As to the photoresist spray system, the amount of a photoresist liquid sprayed is one of main check items. For example, how many milliliters can be sprayed out in several seconds. In practice, it is found that the amount of photoresist liquid sprayed is inversely proportional to use time. This results from the filter 12 congested by photoresist particles. When the decrease in the amount of the photoresist liquid sprayed is found, an operator must adjust the speed controller 28 to allow the pump 12 to evacuate more amount of the photoresist liquid for compensation.

Assume that the photoresist spray system is installed with a new filter 14. Since the filer 14 is not congested by photoresist particles at all, a required amount of photoresist liquid sprayed can be easily obtained by just adjusting the speed controller 18 to a lower position. However, several weeks or months later, the speed controller 18 must be adjusted to a higher position for obtain the required amount of the photoresist liquid sprayed.

According to the prior speed controller 18, there is no way to predict the extent of the filter 14 congested. In general, the filer 14 is replaced with a new one by time, for example, once two months, regardless whether the filer 14 is still functional or not. As a result, it is possible that the filter 14, which cannot function well any more, is still used before the time for replacement, leading to a failure. This may be caused by an extra processing to have the filter 14 seriously congested or the unclean photoresist bottle 16 having congealed photoresist therein. Thus, a photoresist is poorly formed on the wafer 16.

Furthermore, the prior speed controller shown in FIG. 2 has no scales designed thereon. Therefore, an operator adjusts the speed controller only based on operating results. It seems reasonable to be widely used in the semiconductor process. However, there are disadvantages as follows.

(1) The speed controller is lack of previous alarm. If the system is already regulated, the speed controller should be adjusted within a certain range, so that the same results can be obtained under the same conditions. However, if the speed controller is abnormally adjusted, this implies that the system encounters a serous failure somewhere. Since no scales are designed on current-used speed controllers made by various manufacturers, the above-stated problem cannot be previously discovered and resolved.

(2) If the speed controller is adjusted only based on operating results, it seems to take the materials and products as experiments, resulting in the increase of manufacturing costs. An operator learns the speed controller should be adjusted only when failures are encountered. This is obviously unreasonable.

(3) The speed controller cannot be precisely adjusted.

(4) It is not convenient for engineering analysis.

SUMMARY OF THE INVENTION

In view of the above, a first object of the invention is to provide a speed controller with scales for resolving the problem of being lack of previous alarm stated in the prior art.

A second object of the invention is to provide a speed controller with scales for a more precise control and adjustment, thereby increasing yield.

To obtain the above-mentioned objects, a speed controller with scales according to the invention, suitable for adjusting the amount of an air flow thereby to control the amount of a chemical liquid sprayed, includes a housing, a controller body and a transparent tube. The controller body is partly inserted in the housing and has a rotary button located at one end thereof and outside the housing. The rotary button has a slot and an indicator thereon, wherein the indicator is located at one end of the slot. The transparent tube, having a vertical scale on the side thereof and a circular scale on the top circumference thereof, encloses the rotary button.

BRIEF DESCRIPTION OF THE DRAWINGS

The invention will be more fully understood from the detailed description given hereinbelow and the accompanying drawings, which are given by way of illustration only, and thus do not limit the present invention, and wherein.

DETAILED DESCRIPTION OF THE INVENTION

Figure 1:
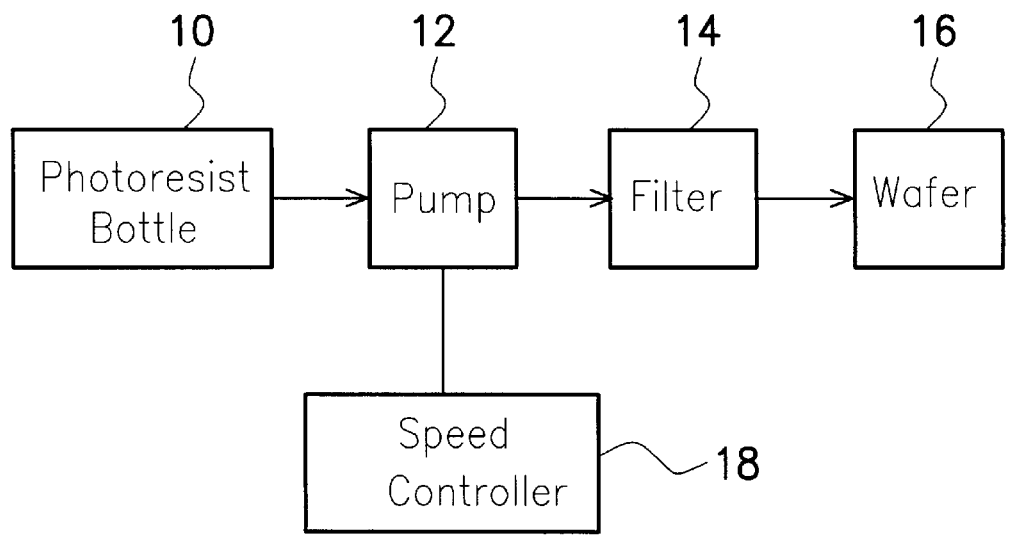
FIG. 1 is a block diagram showing a photoresist spray system.
Figure 2:
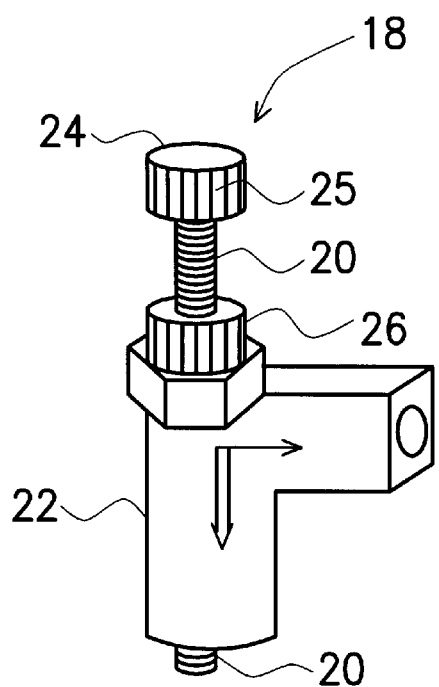
FIG. 2 is a perspective view showing a speed controller according to the prior art.
Figure 3:
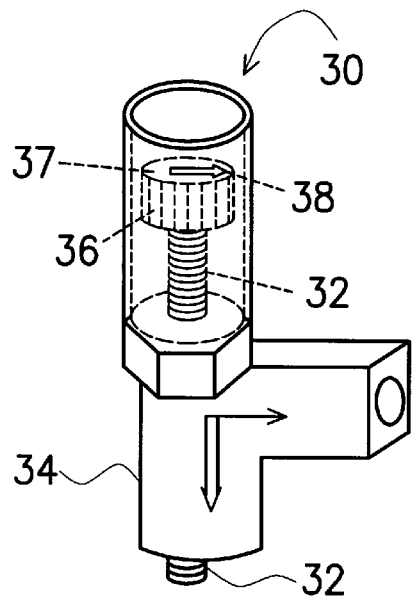
FIG. 3 is a perspective view showing a speed controller according to a preferred embodiment of the invention.
Figure 4:
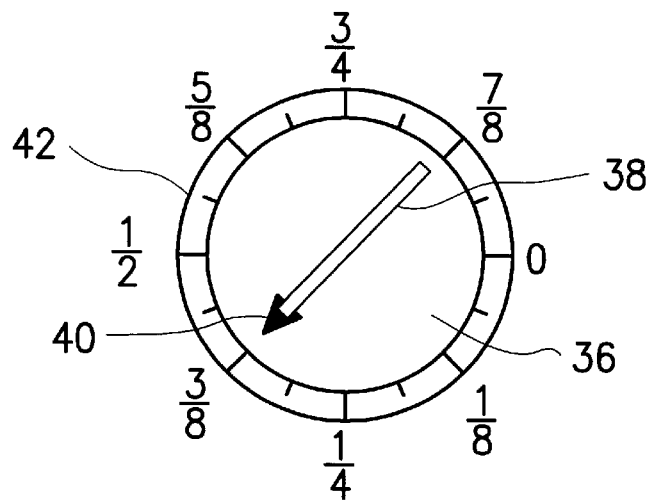
FIG. 4 is a magnified view showing the top surface of a rotary button of a speed controller according to a preferred embodiment of the invention.
Figure 5:
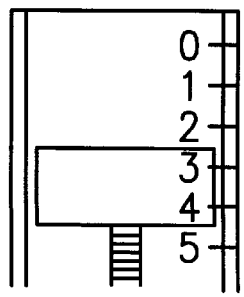
FIG. 5 is a magnified view showing a portion of a speed controller according to a preferred embodiment of the invention.

Referring to FIG. 3, a speed controller according to a preferable embodiment of the invention is shown. For example, the speed controller is an SMC 1200 series speed controller or an SMC 1400 series speed controller. Referring to FIG. 4, there is shown a rotary button of the speed control according to the invention. Furthermore, FIG. 5 is a magnified view showing a portion of the speed controller.

The speed controller 30 includes a housing 34 and a controller body 32 partly inserted in the housing 34. The controller body 30 has a rotary button 36 located at one end thereof and outside the housing 34. The rotary button 36 has no stripes thereon, but has a slot 38, such as an elongated slot, on the top surface thereof as shown in FIG. 4. The rotary button 36 can be rotated by using a tip-elongated screwdriver to engage the elongated slot 38, thereby adjusting an amount of a photoresist liquid sprayed. The slot 38 can also be a crossed slot. Under this condition, the rotary button 36 can be rotated by using a tip-crossed screwdriver. Furthermore, an indicator 40, such as an arrow, is located at one end of the slot 38 for indicating how many turns the rotary button 36 has been rotated.

It is noted that the speed controller 30 further includes a transparent tube 42 which is used to enclose the rotary button 36. The outside surface of the transparent tube 42 has a vertical scale with scales, 0, 1, 2, 3, . . . while the top circumference of the transparent tube 42 has a circular scale with scales, 0, ⅛., ¼, . . . as shown in FIG. 5. The position of the rotary button 36 can be determined by reading the vertical scale and the circular scale. Since the rotary button 36 is enclosed by the transparent tube 42, and a screwdriver must be used to adjust the rotary button 36, the rotary button 36 cannot be unintentionally adjusted or contacted. Therefore, it is unnecessary to install an additional fixing button 26 as stated in prior art.

As an example, the position of the rotary button 36 ascends or descends one scale once the rotary button 36 is rotated one turn. If less than one turn is rotated, the circular scale is added to precisely determine the position of the rotary button 36. As shown in FIGS. 4 and 5, it can be known that the rotary button 36 is rotated 2 and ⅜ turns.

When the speed controller 30 is applied in a real system, it can be set that a filter must be replaced with a new one whenever the speed controller 30 is adjusted to a certain scale. That is, the replacement of the filter depends on the scales instead of the time as stated in the prior art, wherein the scales indicates the extent of the filter congested. As a result, the problem stated in the prior art of forcing the filter, which cannot function well, to be continuously used is resolved, thereby ensuring the quality of a formed photoresist. On the other hand, if photoresist is unclean or photoresist is congealed to cause the filter deteriorated, it can be shortly discovered that the speed controller 30 has been abnormally adjusted. Even which photoresist bottle to cause the problem or which date the problem is caused can be found for eliminating the root cause.

Moreover, if the deterioration of the system, such as the filter, is inevitable, each time the speed controller should be adjusted within a small range. However, if the traditional speed controller is used, the difference between the amounts thereof adjusted in the last time and the next time cannot be known owing to lack of scales. In contrast, if the speed controller according to the invention is used, the vertical and circular scales can be recorded for each check. Sometimes an abnormality is encountered. For example, in general, only one scale is required to be adjusted to reach a standard amount sprayed, but why it is required to adjust 7 scales today. At this time, this problem can be shortly discovered, and then resolved. Furthermore, the speed controller of the invention is suitable for a long-term follow.

In summary, the speed controller with scales according to the invention has the following advantages.

(1) the deterioration of the system can be previously discovered.

(2) The extent of deterioration of the system can be determined by reading the scales, thereby increasing yield.

(3) The rotary button can be precisely adjusted.

(4) It is convenient for engineering analysis.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A speed controller with scales, used to adjust the amount of an air flow thereby to control the amount of a chemical liquid sprayed, the speed controller comprising:

a housing;

a controller body partly inserted in the housing and having a rotary button which is located at one end thereof and outside the housing, wherein the rotary button has a slot and an indicator thereon, and the indicator is located at one end of the slot; and a transparent tube enclosing the rotary button, which has a vertical scale on the side thereof and a circular scale on the top circumference thereof.

2. The speed controller as recited in claim 1, wherein the speed controller comprises an SMC 1200 series speed controller.

3. The speed controller as recited in claim 1, wherein the speed controller comprises an SMC 1400 series speed controller.

4. The speed controller as recited in claim 1, wherein the rotary button has no stripes thereon.

5. The speed controller as recited in claim 1, wherein the slot is an elongated slot.

6. The speed controller as recited in claim 5, wherein the rotary button is rotated by using a tip-elongated screwdriver to engage the elongated slot thereby to adjust the amount of a chemical liquid sprayed.

7. The speed controller as recited in claim 1, wherein the slot is a crossed slot.

8. The speed controller as recited in claim 7, wherein the rotary button is rotated by using a tip-crossed screwdriver to engage the crossed slot thereby to adjust the amount of a chemical liquid sprayed.

9. The speed controller as recited in claim 1, wherein the position of the rotary button is determined by reading the circular scale and the vertical scale.

10. The speed controller as recited in claim 1, wherein the indicator is an arrow.

11. The speed controller as recited in claim 1, wherein the chemical liquid is a photoresist liquid.

* * * * *